July 5, 1955     D. J. NAUMANN     2,712,421

FOLDING WING AIRCRAFT

Filed Aug. 21, 1953     2 Sheets-Sheet 1

Donald J. Naumann
*INVENTOR.*

BY *James H. Clark*

HIS PATENT ATTORNEY

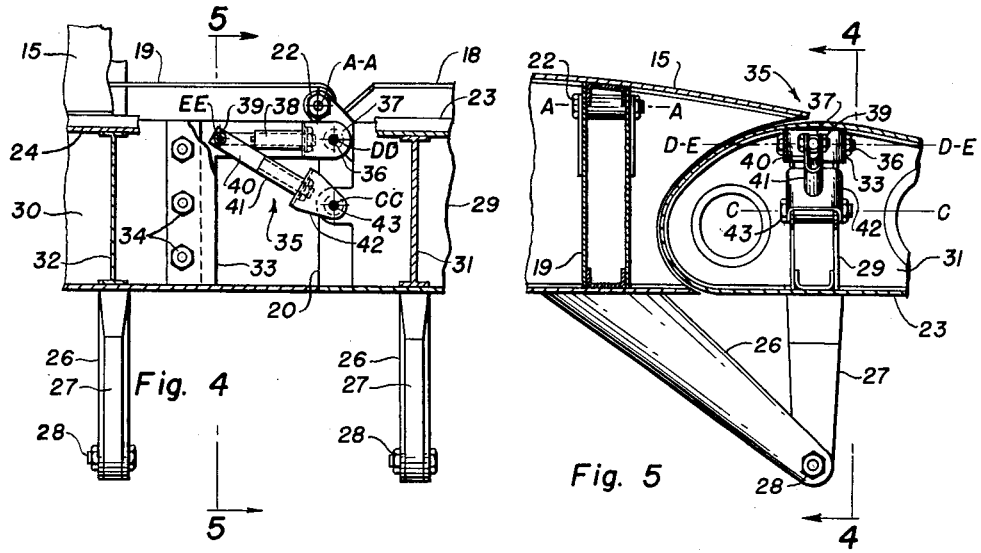
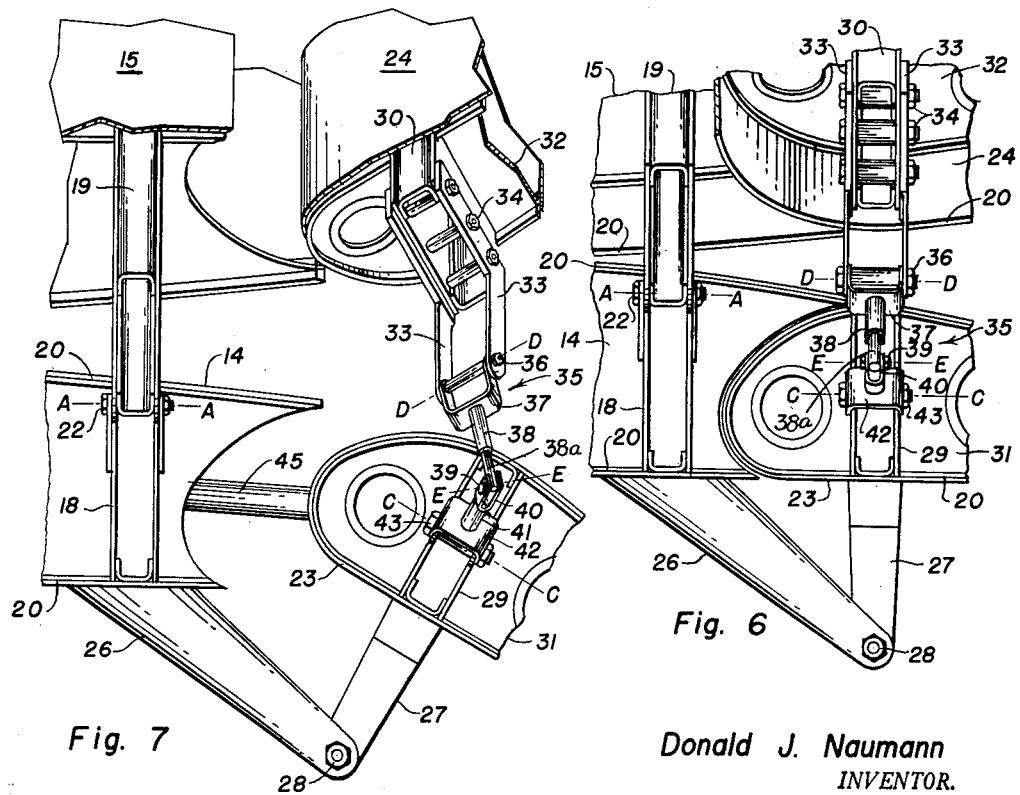

United States Patent Office 2,712,421
Patented July 5, 1955

2,712,421

FOLDING WING AIRCRAFT

Donald J. Naumann, Inglewood, Calif., assignor to North American Aviation, Inc.

Application August 21, 1953, Serial No. 375,650

5 Claims. (Cl. 244—49)

The present invention relates generally to aircraft having foldable wings and more particularly to improved interconnecting mechanism for the flaps and other surfaces divided or separated by the folding wing portions.

The advantages of aircraft having foldable wings to facilitate storage of the aircraft aboard carriers or within hangars have been well known and this type has been used quite extensively. In the operation of folding wing aircraft to and from the decks of aircraft carriers, the speed of operation is a primary factor and one of the major objectives of the present invention is to facilitate the folding and unfolding of the wings of this type aircraft. In high performance military aircraft, it is particularly important that the wings be folded rapidly after a landing on a carrier deck and also that they be opened without delay when the aircraft is taken from its parked or stowed position and made ready for its take-off. Heretofore these operations were considerably delayed due to the necessity of retracting the portions of the flaps which are divided by the hinge lines of the folding wing panels.

The present invention is directed to an improved interconnecting mechanism for such flap or other surface installations on folding wing type aircraft whereby the wings are permitted to be folded regardless of the relative position of the flap portions with respect to the wing panels. Alternatively, the present improved mechanism and flap installation is such that the flaps may be retracted simultaneously with the wing folding operation without interference between the respective operating mechanisms. Among other objects and advantages of the present invention, is the provision of an installation wherein a relatively simple mechanism eliminates the need for safety interlocks between the wing folding and the flap position systems. A further and corollary object of the present invention is to provide an arrangement which permits speedier handling operations particularly during the landings of carrier-based aircraft.

Other objects and advantages of the present invention will become apparent to those skilled in the art after reading the present description, taken in conjunction with the accompanying drawings, forming a part hereof, in which:

Fig. 4 is an enlarged sectional view looking forward as taken along the lines 4—4 of Fig. 1, with the flap portions in the retracted position;

Fig. 5 is a sectional view of the same looking inboard as taken along the lines 5—5 of Figs. 1 and 4;

Fig. 6 is a similar view, as in the case of Fig. 5, but with the outer wing panel and flap section in the folded position; and Fig. 7 is a similar view, as in the case of Fig. 6, except that the flap portions are shown in extended positions, this view being as taken along the lines 7—7 of Fig. 2.

Figure 1:
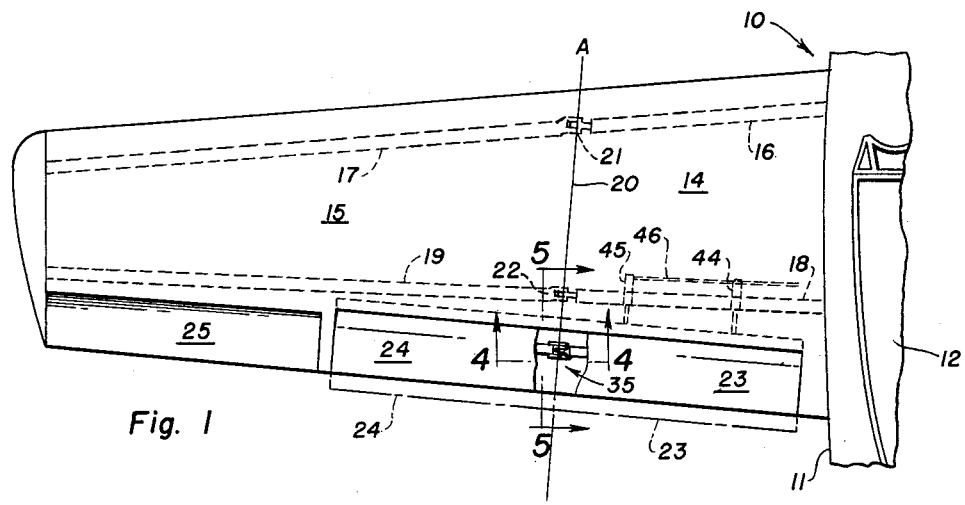
Fig. 1 is a plan view of a folding wing aircraft having a flap divided by the wing hinge line, and to the flap portions of which a form of the present invention has been applied.
Figure 2:
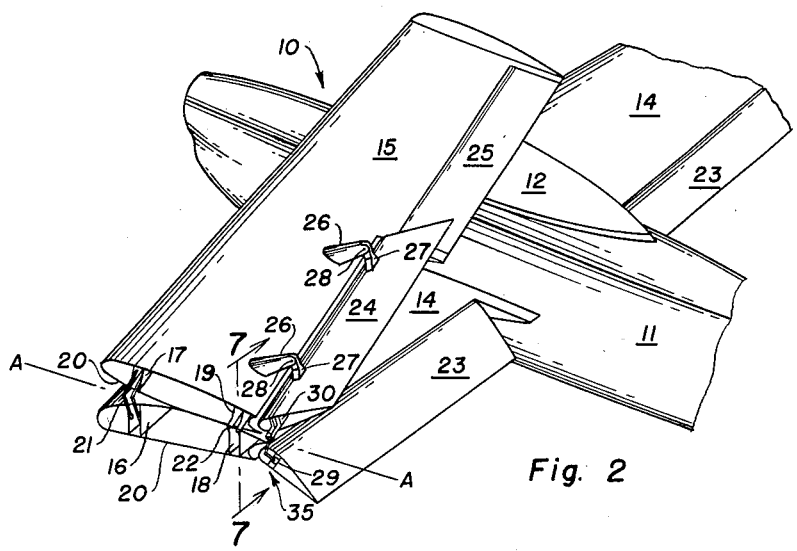
Fig. 2 is a perspective view of the same with the wing shown in its folded position, and with the flap portions extended.
Figure 3:
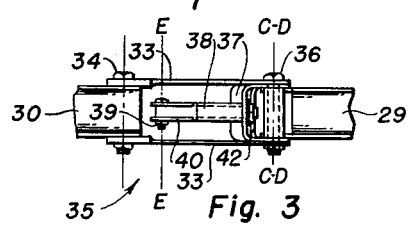
Fig. 3 is an enlarged detail plan view of the flap interconnecting mechanism as viewed in plan in Fig. 1.

Referring now to Figs. 1 and 2, the numeral 10 designates an aircraft which may be propelled by a jet power plant, or by other suitable means, the craft being provided with a fuselage 11 and canopy 12 associated with the control cockpit thereof. Laterally extending folding wings 14—15 extend from the sides of the fuselage 11, the inboard wing portions 14 being fixed to the fuselage and the outboard portions 15 being hinged at the outer ends of the fixed portions 14. These fixed inboard portions of the wing are provided with front and rear spars 16 and 18, respectively, and the foldable outboard portions 15 are similarly provided with front and rear spars 17 and 19, respectively. The surfaces of the wing portions are cut to provide an abutting joint as indicated by substantially chordwise extending lines 20 in Fig. 1 as formed by the abutting edges of the wing portions shown in Fig. 2. The front wing spars 16 and 17 are interconnected by a hinge fitting 21 and the rear spars 18 and 19 are similarly interconnected by the hinge fitting 22.

The fixed inner wing portion 14 is provided with an inner flap portion 23 pivotally supported at the wing trailing edge and the folding wing portion 15 is similarly provided with an outer flap portion 24 which cooperates in the extended position of the wing with the inner flap portion 23 to form a unitary continuous trailing edge flap, shown in full lines in Fig. 1 in its retracted position, and in construction lines in the extended position. The folding wing portion 15 is also provided with an aileron 25 adjacent its wing tip outboard of the flap portion 24 by which lateral control of the aircraft 10 is obtained. As may be seen in Fig. 2, wing brackets 26 extend beneath the lower surfaces of the wing portions 14 and 15 and cooperate with similar brackets 27 fixedly attached to the lower surfaces of the flap portions 23 and 24, the bracket elements being pivotally interconnected by the intermediate pivot pins 28.

Referring now to the remaining figures, it will be noted that the inboard flap portion 23 is provided with a main spanwise extending spar 29 and the outboard portion 24 is similarly provided with a spar 30. The internal structure of the flap portions is also provided with the chordwise extending ribs or formers 31 and 32 in the inboard and outboard flap portions, respectively, and at which positions the flap brackets 27 are preferably located.

To the inboard end of the spar 30 of the outboard flap portion 24, and to the opposed outboard end of the spar 29 of the inner flap portion 23, there is attached the interconnecting mechanism 35 by means of which the present improved results are obtained. The mechanism 35 is supported at the spar 30 by means of the spaced L-shaped fittings or brackets 33 by means of the bolts 34. The brackets 33 are attached to the spar end along their normally vertical legs as viewed in Fig. 4 and the horizontal legs extend in the spanwise direction inwardly beyond the substantially chordwise axis A—A of the wing hinge fittings 21 and 22 about which the wing is folded. The inner ends of the brackets 33 are apertured at a point spaced inboard of and somewhat below the axis A—A to provide a further but parallel axis D—D for the pivot pin 36. A yoke fitting 37 is similarly apertured for engagement by the pivot pin 36 and fits within or between the spaced brackets 33 with respect to which it is freely pivotable. A stem or spindle element 38a is rotatably mounted within the cylindrical hub portion 38 fixed to the yoke 37 and the outer end of the stem 38a is apertured to receive the pivot 39 to provide an intermediate pivot axis E—E. The yoke 37, and the spindle 38a form a link of the universal joint assembly 35, the other and somewhat longer link being comprised of the bifurcated spindle 40, the hub 41 and the yoke 42 pivotally mounted upon the spar 29 by means of the pivot bolt 43 to provide the pivot axis C—C. The elements of this universal interconnecting assembly 35, accordingly, are free to rotate about the axes C—C, D—D and E—E as a result of their pivotal mountings upon the spars 29 and 30, as well as the ability of the spindles 38a and 40 being rotatably mounted within the hub portions of the yokes 37 and 42. The spindles are, however, suitably retained within the hub portions such that the assembly 35 transmits appreciable tension between the pivots 36 and 43.

As shown in Fig. 4, in the aligned and locked condition of the wing portions 14 and 15, as well as the normal or fully retracted position of the flap portions 23 and 24, the pivot axis E—E is spaced outboard of and at substantially the same elevation as the previously mentioned pivot axis D—D, and the third or lower pivot axis C—C of the assembly is disposed below the pivot axis D—D, all of these axes extending parallel to each other and to the main fold axis A—A in substantially chordwise directions. The flap assembly 23—24 may be suitably actuated by hydraulic actuators 44 and 45 having their piston portions connected to the inboard flap portion 23 and provided with actuating fluid through the conduits 46. As indicated above, the links of the interconnecting assembly 35 are of sufficient strength to carry the loads encountered in moving the outer panel by means of the movement of the inner panel 23. The flap actuation can alternatively be provided by suitable electrical, mechanical or other means, and alternatively the actuating means may be connected directly to each flap section in which case suitable means should preferably be provided for positively coordinating the movements of the panels in the event they were independently driven.

In the disposition of the universal linkage 35, as shown in Fig. 4 in the retracted and aligned position of the flap portions 23 and 24, the mechanism 35 serves to lock the flap portions together such that, as the inner portion 23 is actuated, the outer portion 24 will move therewith as a unit. In the event the wings are folded with the flap sections in the retracted position shown in Fig. 4, the outer wing 15 is caused to rotate in the clockwise direction about the wing hinge fittings 21 and 22 and about the axis A—A, during which the pivot axis D—D is also caused to rotate in a clockwise direction about the axis A—A thereby imparting an opening or unfolding movement to the link mechanism 35. In each of the relative positions of the links of the assembly 35, however, the upper link is confined by its pivotal mounting 36 to rotate within the plane of the flap spar 30, and the lower or longer link of the assembly 35 is caused to rotate about the axis 43 within the plane of the flap spar 29. In such folding of the outer wing portion 15 with the flaps in their retracted positions, the axes C—C, D—D and E—E remain parallel and the outer flap portion 24 is caused to remain in its retracted position with respect to the outer wing portion 15 solely due to the interconnecting mechanism 35.

In the event, as is customarily the case, the aircraft is landed with the flaps in their extended landing positions, the wing may be folded without first retracting the flaps. In this condition, the parallel axes C—C, D—D and E—E, although not parallel to the main wing folding axis A—A, and the mechanism 35 would nevertheless maintain the outer flap section 24 in its extended position during folding of the wing. During this operation of the folding of the wing with the flap sections in their extended positions, the links of the interconnecting mechanism 35 are again confined within the planes of the respective flap spars to which they are pivotally connected and the midpoint of the pivot axis at E—E is disposed at the intersection of these two spar planes, both of the spindles connected to the intermediate pivot bolt 39, defining the axis E—E, being rotatable within the hubs of the respective yoke portions. These spindles, while being rotatably mounted within the hub portions, are prevented from any axial movement therewith such that the link mechanism 35 is permitted to withstand considerable tension or pull between the pivot axes C—C and D—D to thereby maintain the relative position of the outer flap with respect to the folding wing panel.

While the relative disposition of the links of the interconnecting mechanism 35 is not considered particularly critical, a preferred arrangement which has given satisfactory service has been illustrated in the drawings. The kinematics can readily be determined by the structural requirements, the space available in the closed position, the clearances during movement, and the flap hinge point and travel of the particular installation. Depending upon the particular linkage arrangement utilized, the flap position relative to its wing panel might be influenced slightly by the wing folding action, but the arrangement illustrated has shown no tendency to react in this manner. In the event, however, the flap sections are so interconnected as to tend to change position during movement of the wing, the inboard section should preferably be controlling and the outboard section should be permitted to properly reorient itself upon being restored to the normal operating position. In other words, it is not particularly important where the outer flap section is positioned when the wing is folded. It is desirable, of course, to avoid designs which give rise to such a couple if it appeared, for example, that folding the wing partially deflected the outer flap section in such manner that subsequent action to deflect the flaps would result in an over-travel of that section. This could conceivably damage the structure in the event the normal down limit of movements were exceeded and over-travel for the flap might preferably be provided in such instances and the down limit stops arranged to function only with the wing extended.

Other forms and modifications of the present invention, both with respect to its general arrangement and the details of its respective parts, which may become apparent to those skilled in the art after reading the present description, are intended to come within the scope and spirit of this invention as more particularly set forth in the following claims.

I claim:

1. In an aircraft having folding wings, first and second wing portions relatively foldable with respect to each other, a first movable surface pivotally mounted upon said first wing portion, a second movable surface pivotally mounted upon said second wing portion, means for folding one of said wing portions with respect to the other said wing portion, and means including a pair of universally interconnected links separately connected respectively to each of said movable surfaces whereby the relative disposition of each said movable surface with respect to its respective wing portion is maintained during the folding of said wing portion.

2. In an aircraft having a folding wing with a fixed inner panel and a movable outer panel, a movable surface portion pivotally mounted upon said fixed inner wing panel, a movable surface portion pivotally mounted upon said movable outer wing panel, said movable surface portions arranged for actuation between extended and retracted positions, means including a pair of links separately pivotally mounted upon said respective movable surface portions, each said link provided with an axially rotatable means confined by its pivotal mounting to rotate within a given plane with respect to its movable surface portion and a pivotal interconnection at the intersection of said axially rotatable means whereby the relative disposition of each said movable surface portion with respect to its respective wing panel is maintained throughout the folding of said wing panels.

3. In an aircraft having a folding wing with a fixed inner panel and a movable outer panel foldable about a wing fold axis, a movable surface portion pivotally mounted upon said fixed inner wing panel, a movable surface portion pivotally mounted upon said movable outer wing panel, said movable surface portions arranged for actuation as a unit in the normal aligned disposition of said wing panels, and means including a pair of universally interconnected links separately pivotally mounted upon said respective movable surface portions, each said link provided with an axially rotatable element confined by its pivotal mounting to rotate within a given plane with respect to its respective movable surface portion, and a pivotal interconnection at the intersection of said rotatable elements.

4. In an aircraft having a folding wing with a fixed inner panel and a movable outer panel foldable about a wing fold axis, a movable surface portion pivotally mounted upon said fixed inner wing panel, a movable surface portion pivotally mounted upon said movable outer wing panel, said movable surface portions arranged for actuation as a unit in the normal aligned disposition of said wing panels, and mechanism interconnecting said movable surface portions including a pair of universally interconnected links separately pivotally mounted upon said respective movable surface portions, each said link provided with an axially rotatable spindle element confined by its pivotal mounting to rotate within a given plane with respect to its respective movable surface portion and a pivotal interconnection at the intersection of said spindle elements.

5. An aircraft having a folding wing arrangement of the type called for by claim 4 characterized by said movable surface portions arranged in such manner that said surface portions are downwardly extendible from neutral position in which said portions are aligned with the respective wing panels, and the said said links constructed with dissimilar lengths with said link connected to the movable surface portion of said outer wing panel shorter than the other said link.

References Cited in the file of this patent

UNITED STATES PATENTS

| | | |
|---|---|---|
| 2,406,073 | Griswold et al. | Aug. 20, 1946 |
| 2,534,764 | Focht | Dec. 19, 1950 |
| 2,538,602 | Taylor et al. | Jan. 16, 1951 |